US008013283B2

(12) United States Patent
Lee et al.

(10) Patent No.: US 8,013,283 B2
(45) Date of Patent: Sep. 6, 2011

(54) PROJECTOR HAVING A COMMUNICATION UNIT WHICH COMMUNICATES WITH AT LEAST ONE OTHER PROJECTOR DIFFERENT FROM THE PROJECTOR AND MULTIPLE PROJECTION CONTROL METHOD OF THE PROJECTOR

(75) Inventors: Gene Moo Lee, Seongnam-si (KR); Jin Wook Lee, Yongin-si (KR); Hun Lim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 871 days.

(21) Appl. No.: 12/032,711

(22) Filed: Feb. 18, 2008

(65) Prior Publication Data

US 2009/0085828 A1    Apr. 2, 2009

(30) Foreign Application Priority Data

Oct. 1, 2007 (KR) .......................... 10-2007-0098955

(51) Int. Cl.
*H01L 27/00* (2006.01)

(52) U.S. Cl. ..................................... 250/208.1; 250/221
(58) Field of Classification Search .................. 250/221, 250/208.1, 214 R; 345/419, 173, 1.1; 353/30, 353/31, 34, 48; 359/459, 460; 715/736, 715/781; 348/565, 564, 588
See application file for complete search history.

(56) References Cited

U.S. PATENT DOCUMENTS 5,900,916 A * 5/1999 Pauley ............................ 725/59
* cited by examiner

*Primary Examiner* — Que T Le
(74) *Attorney, Agent, or Firm* — NSIP Law

(57) ABSTRACT

There is provided a projector including a projection control unit which controls a projection of a background window and computes location information of at least one projection window projected on the background window, a performance sensing unit which senses an object performance on the background window and the at least one projection window, a communication unit which communicates with at least one other projector different from the projector, and an information control unit which controls an operation of each of the at least one other projector, the operation corresponding to the object performance.

18 Claims, 11 Drawing Sheets

PROJECTOR HAVING A COMMUNICATION UNIT WHICH COMMUNICATES WITH AT LEAST ONE OTHER PROJECTOR DIFFERENT FROM THE PROJECTOR AND MULTIPLE PROJECTION CONTROL METHOD OF THE PROJECTOR

CROSS-REFERENCE TO RELATED APPLICATION

This application claims the benefit under 35 U.S.C. §119(a) of a Korean Patent Application No. 10-2007-0098955, filed on Oct. 1, 2007, in the Korean Intellectual Property Office, the entire disclosure of which is incorporated herein by reference.

TECHNICAL FIELD

The following description relates to a projector and method of controlling multiple projections. More particularly, the description relates to a projector and a multiple projection control method of the projector which controls an object performance occurring on each projection window, projected by a plurality of other projectors, via a background window.

BACKGROUND

Currently, new types of input interfaces such as a virtual keyboard, a surface computer, and a multi-touching sensing, have been developed. Along with the development of such input interfaces, a user interface which projects a screen, via a projector, where the input interface is made available and enables a user to operate a computing performance on the screen has been being developed.

When such a user interface is implemented through a portable terminal, users may project each user interface screen via a user's portable terminal, and thereby may conveniently exchange information at any time and place. Accordingly, the development of a new technology which may embody information exchange among users via the user interface screen is needed.

SUMMARY

In one general aspect, there is provided a projector and multiple projection control method of the projector which projects a background window, enables at least one other projector to project projection windows on the background window, thereby recognizing an object performance occurring on each of the projection windows through the background window, and control a corresponding operation of each of the at least one other projectors.

In another general aspect, a projector includes: a projection control unit which controls a projection of a background window and computes location information of at least one projection window projected on the background window; a performance sensing unit which senses an object performance on the background window and the at least one projection window; a communication unit which communicates with at least one other projector different from the projector; and an information control unit which controls an operation of each of the at least one other projector, the operation corresponding to the object performance.

In still another general aspect, a projector includes: a communication unit which receives projection window information from at least one other projector different from the projector; a projection control unit which controls a background window including a projection window corresponding to the projection window information to be projected on a predetermined location; a performance sensing unit which senses an object performance on the background window and each of the at least one projection window; and an information control unit which controls an operation of each of the at least one other projector, the operation corresponding to the object performance.

In yet another general aspect, a multiple projection control method includes: projecting a background window on a predetermined location; computing location information of at least one projection window projected on the background window; sensing an object performance on the background window and each of the at least one projection window; and controlling an operation of each projector, the operation corresponding to the object performance.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Terminologies used in the present specification are described below.

1) background window: A background window may refer to a screen projected by a projector according to an exemplary embodiment. For example, the background window may be embodied as a transparent screen or a multi touch screen. Also, the background window may be embodied to sense a variety of operations occurring on another multi touch screen projected in a frame form on the background window.

2) projection window: A projection window may refer to a screen projected in a frame form on a background window according to an exemplary embodiment. The projection window may be embodied as a multi touch screen.

3) object: An object may refer to a software entity existing in a projection window. For example, the object may be embodied as a picture, music, telephone book, e-mail, and the like, and may be displayed as an icon on the projection window.

4) object performance: An object performance may refer to an object input of a user. For example, when the user desires to play a video by double-clicking the object on the projection window which is embodied as the multi touch screen using user's fingers, the double-click of the user may be the object performance. Also, when the user drags an object from a first projection window to a second projection window using the user's fingers, the dragging may be the object performance.

Figure 1:
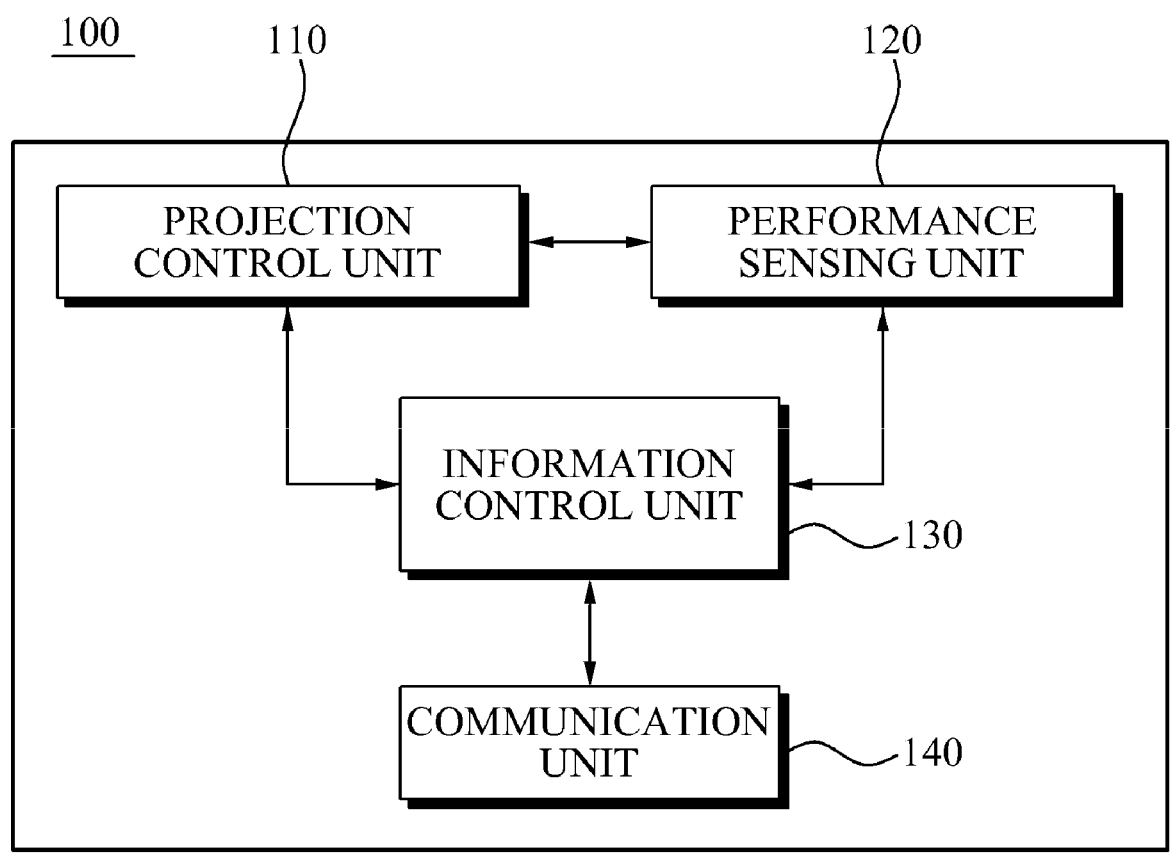
FIG. 1 is a block diagram illustrating a configuration of an exemplary projector.

FIG. 1 illustrates a configuration of an exemplary projector.

The projector 100 includes a projection control unit 110, a performance sensing unit 120, an information control unit 130, and a communication unit 140.

The projection control unit 110 controls a background window to be projected on a predetermined location. Specifically, when a user moves the projector 100 towards a particular direction, and inputs a projection command of the background window, the projection control unit 110 projects the background window to the particular direction.

After the background window is projected, at least one projection window may be projected on the background window in a frame form. The at least one projection window may be projected by at least one other projector different from the projector 100, or may be projected by the projector 100. Also, the projector 100 may project a background window including the at least one projection window. A projection type of the at least one projection window depending on each case described above is described in detail with reference to FIGS. 2 through 4.

Figure 2:
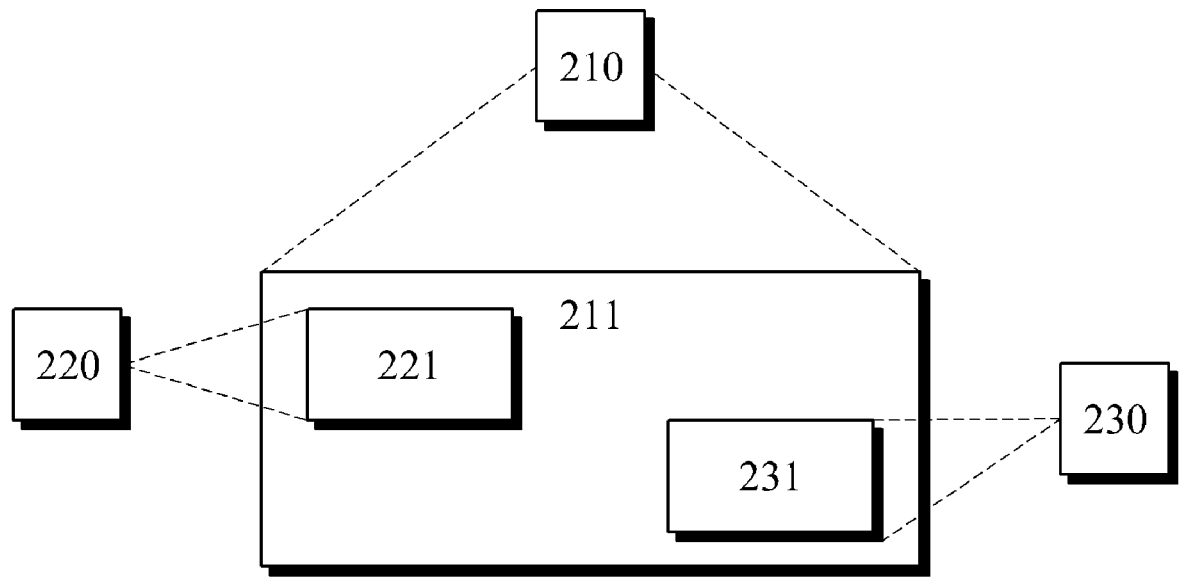
FIG. 2 is a diagram illustrating a projection window projected on a background window according to an exemplary embodiment.

FIG. 2 illustrates projection windows 221 and 231 projected on a background window 211 according to an exemplary embodiment.

According to an exemplary embodiment, at least one projector 220 and 230, which are different from a projector 210, may project each of the projection windows 221 and 231 on the background window 211 projected by the projector 210. For example, as illustrated in FIG. 2, the first projector 220 may project the first projection window 221 on the background window 211 projected by the projector 210, and the second projector 230 may project the second projection window 231 on the background window 211.

The background window 211 may be embodied as a transparent screen with a base line of a predetermined color. The first projection window 221 and the second projection window 231 may be embodied as a screen having different colors, respectively, to be readily identifiable. For example, a border of the first projection window 221 may be embodied in a red color, and a border of the second projection window 231 may be embodied in a blue color.

In this instance, the first projector 220 and the second projector 230 may transmit its own color information of the projection window to the projector 210. The projector 210 may identify a projector projecting a projection window on the background window 211, based on the color information of each of the projection windows received from each of the first projector 220 and the second projector 230.

As described above, the identification of the projection window may be embodied using the color information of the projection window and various visual information, for example, displaying a unique identification symbol on the projection window.

Figure 3:
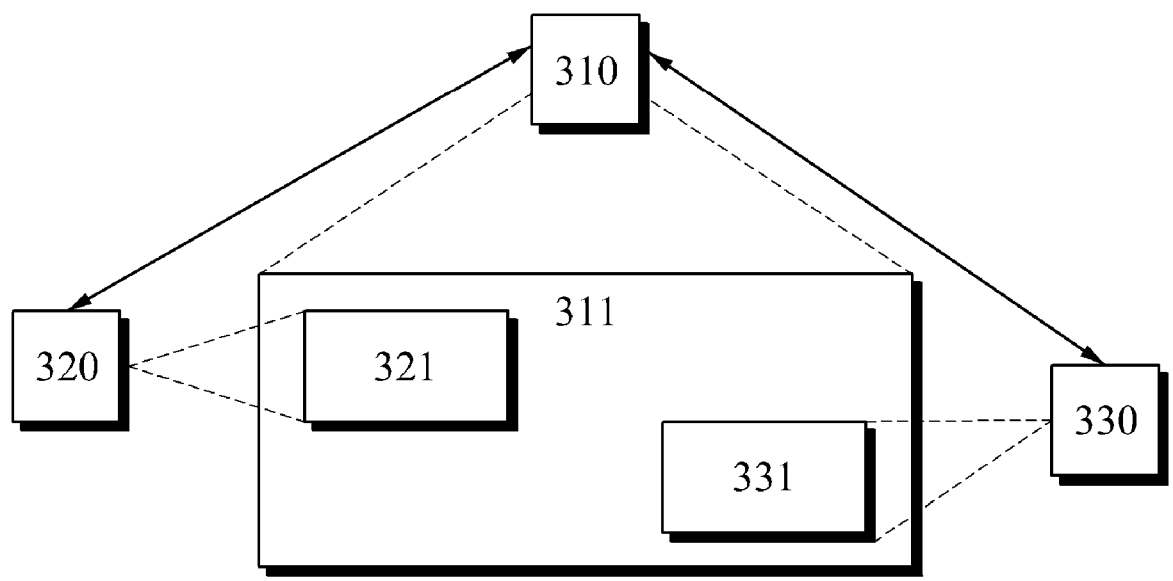
FIG. 3 is a diagram illustrating a projection window projected on a background window according to another exemplary embodiment.

FIG. 3 illustrates projection windows 321 and 331 projected on a background window 311 according to another exemplary embodiment.

According to an exemplary embodiment, a projector 310 receives each projection window information from at least one other projector 320 and 330 which are different from the projector 310. For example, the projector 310 receives first projection window information from the first projector 320, and receives second projection window information from the second projector 330.

The projector 310 projects a background window 311 including a first projection window 321 based on the first projection window information and a second projection window 331 based on second projection window information. Specifically, the first projector 320 and the second projector 330 do not directly project each of the first projection window 321 and the second projection window 331 on the background window 311, and the projector 310 receives the first projection window information and the second projection window information from the first projector 320 and the second projector 330 and may project the background window 311 where the first projection window 321 and the second projection window 331 are displayed based on the received information.

As described above, the background window 311 may be embodied as a transparent screen with a base line of a predetermined color. The first projection window 321 and the second projection window 331 may be embodied as a screen having various visual information, for example, a unique color, to be identified.

Figure 4:
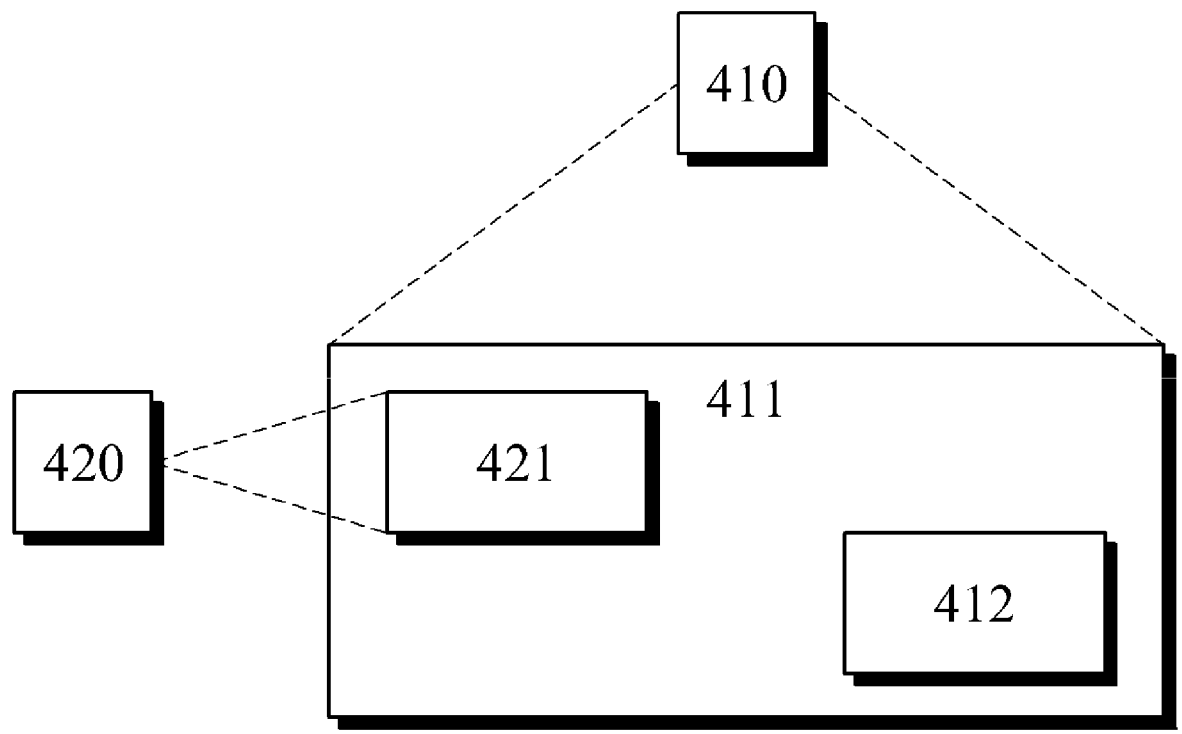
FIG. 4 is a diagram illustrating a projection window projected on a background window according to still another exemplary embodiment.

FIG. 4 illustrates projection windows 412 and 421 projected on a background window 411 according to still another exemplary embodiment.

According to an exemplary embodiment, a projector 410 projects the background window 411, and a first projector 420 projects a first projection window 421 on the background window 411. In this instance, the background window 411 may be embodied to include a second projection window 412. Specifically, the projector 410 may project the background window 411 including the second projection window 412, and the first projector 420 may project the first projection window 421 on the background window 411.

As described above, the background window 411 may be embodied as a transparent screen with a base line of a predetermined color. The first projection window 421 and the second projection window 412 may be embodied as a screen having various visual information, for example, a unique color, to be readily identifiable.

Referring again to FIG. 1, the projection control unit 110 computes location information of the at least one projection window projected on the background window. The projection control unit 110 may compute the location information of each of the at least one projection window using a coordinate plane corresponding to the background window. For example, when the background window is a rectangle having a width of 160 cm and a length of 90 cm, the background window may correspond to a coordinate plane having an x-axis ranging 0 to 160 and a y-axis ranging 0 to 90. A unit of the x-axis and y-axis of the coordinate plane may be set as arbitrary unit (AU) according to a determination of a designer of the system.

The projection control unit 110 recognizes the background window as the coordinate plane, and computes coordinates of each of the at least one projection window projected on the background window. The coordinates of each of the at least one projection window may be embodied as coordinates corresponding to four corners of each of the at least one projection window. For example, coordinates of the projection window in the coordinate plane may be embodied as (A, B, C, D)=((20, 60), (50, 60), (50, 40), (20, 40)).

Also, the location information of each of the at least one projection window may be embodied as a vector of four corners of each of the at least one projection window. In the example described above, the coordinates of the projection window may be embodied as (A, B, C, D), and each of A, B, C, and D may be embodied as a two-dimensional vector of each of the corners with respect to an origin of the coordinate plane.

In addition to the above described location information computation method using coordinates and vector, a variety of methods used in the related art to compute a location of projection window projected on the background window may be used.

The performance sensing unit 120 senses an object performance occurring due to user input, on the background window and the at least one projection window.

As described above, the object performance covers a movement and performance of an object through a user's multi touch sensing input, on the background window and the at least one projection window embodied as the multi touch screen. Also, the object performance includes a variety of performances of the object due to the user's multi touch sensing input, for example, a deletion, rotation, maximization, and minimization of the object as well as the movement and performance of the object.

The performance sensing unit 120 senses an object performance occurring on the background window. Specifically, the performance sensing unit 120 senses an object performance occurring on a projection window projected on the background window as well as the object performance occurring on the background window. An object movement between projection windows may be included in an embodiment of the object performance, which is described in detail with reference to FIG. 5.

Figure 5:
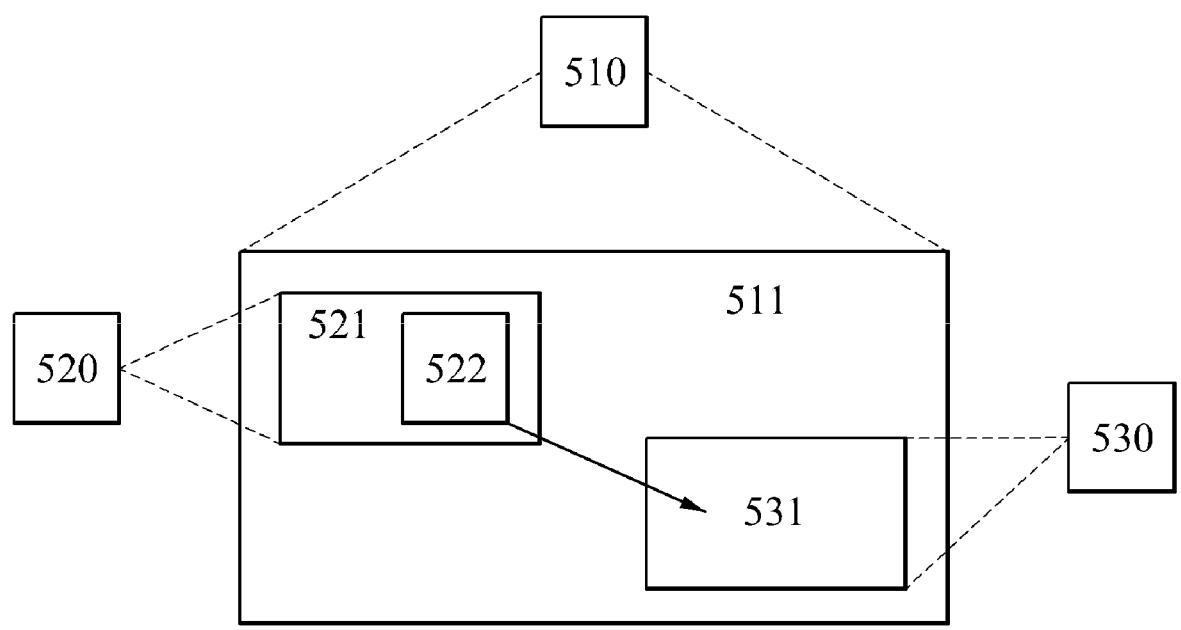
FIG. 5 is a diagram illustrating an object performance with respect to an object movement among projection windows according to an exemplary embodiment.

FIG. 5 is a diagram illustrating an object performance with respect to an object movement among projection windows according to an exemplary embodiment.

In FIG. 5, it is illustrated that a projector 510 projects a background window 511, a first projector 520 projects a first projection window 521 on the background window 511, and a second projector 530 projects a second projection window 531 on the background window 511. Also, the first projection window 521 includes a first object 522.

When a user drags the first object 522 from the first projection window 521 to a second projection window 531 through a multi touch sensing, the projector 510 senses an object performance with respect to the movement of the first object 522. Specifically, a performance sensing unit 120 included in the projector 510 may sense the object performance.

The projector 510 may sense the object performance through a movement of a user's fingers. Specifically, since the background window 511, the first projection window 521, and the second projection window 531 are embodied as a multi touch screen, the projector 510 may sense the object performance by sensing the movement of the user's fingers in contact with the background window 511.

In this instance, while the first object 522 is located on the first projection window 521, the projector 510 and the first projector 520 may sense the object performance. Also, while the first object 522 is located in the background window 511 excluding the first projection window 521 and the second projection window 531, the projector 510 may sense the object performance. Also, while the first object 522 is located in the second projection window 531, the projector 510 and the second projector 530 may sense the object performance.

As described above, the object performance with respect to the movement of the first object 522 may be sensed by the projector 510 via the background window 511. Accordingly, the projector 510 may sense that the object performance is the movement from the first projection window 521 to the second projection window 531.

Also, the object performance may be embodied to include the movement from a projection window to another projection window (1:1 movement) as described above, as well as a movement from a projection window to a plurality of other projection windows (1:N movement), and a movement from a plurality of projection windows to another projection window (N:1 movement).

Also, the object performance may be embodied to include a variety of operations of the object such as a copy, performance, and deletion of the object as well as the movement of the object.

Referring again to FIG. 1, a network connection among the projector 100 and at least one other projector may be available via the communication unit 140. For this, the communication unit 140 may be embodied to include a local area communication module such as a Bluetooth module, Zigbee module, Ultra Wideband (UWB) module, and the like.

The information control unit 130 controls an operation of each of the at least one other projector. The operation corresponds to the object performance sensed by the performance sensing unit 120. For example, as described with reference to FIG. 5, when the object performance is the movement of the first object 522 from the first projection window 521 to the second projection window 531, the information control unit 130 controls the first projector 520 to transmit data corresponding to the first object 522 to the second projector 530.

As described above, the information control unit 130 may control an operation of the at least one other projector, connected via the communication unit 140, in order to embody an operation corresponding to the object performance sensed by the performance sensing unit 120.

As described above, the performance sensing unit 120 may sense the object performance occurring on the background window as well as a projection window performance.

The projection window performance refers to a performance inputted by the user with respect to the at least one projection window projected on the background window. Various embodiments of the projection window performance are described in detail with reference to FIGS. 6 through 10.

Figure 6:
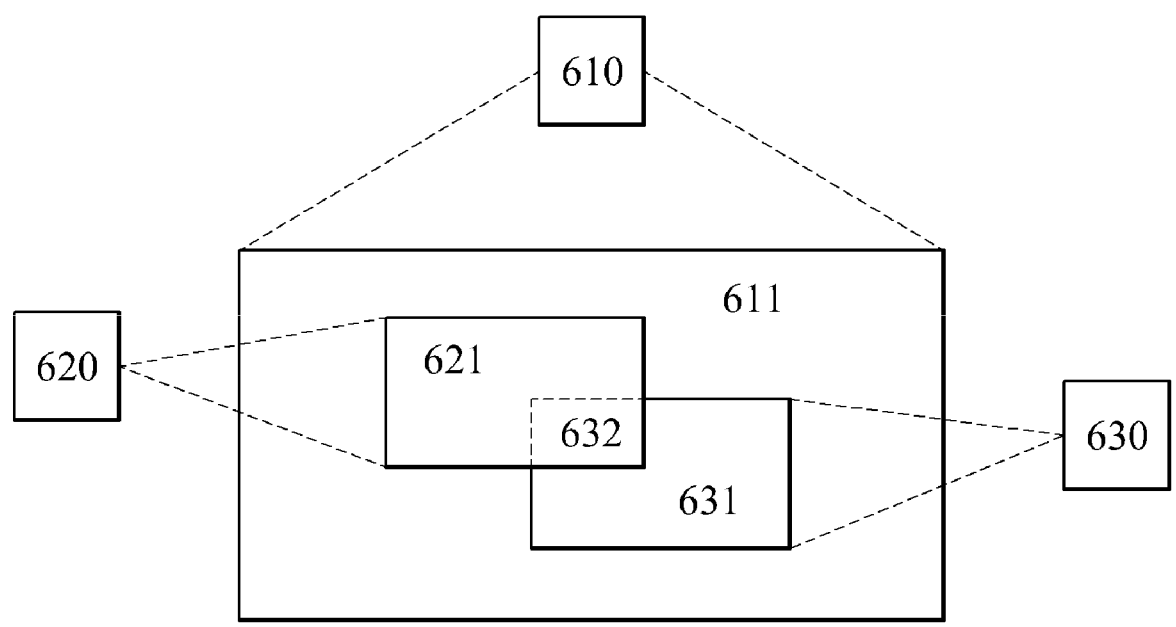
FIG. 6 is a diagram illustrating a projection window performance when two projection windows are overlapped according to an exemplary embodiment.

FIG. 6 illustrates a projection window performance when two projection windows are overlapped according to an exemplary embodiment.

In FIG. 6, it is illustrated that a projector 610 projects a background window 611, a first projector 620 projects a first projection window 621 on the background window 611, and a second projector 630 projects a second projection window 631 on the background window 611.

In this instance, as illustrated in FIG. 6, the first projection window 621 and the second projection window 631 may be projected to overlap an area as large as a predetermined area 632. As described above, location information of the first projection window 621 and the second projection window 631 is computed by a projection control unit 110, and thus the projector 610 may sense that the first projection window 621 and the second projection window 631 may be projected to be overlapped in the predetermined area 632 via a performance sensing unit 120.

In this case, an information control unit 120 of the projector 610 may control the second projector 630 to inactivate the overlapped predetermined area 632 and project the second projection window 631. Specifically, the information control unit 120 may control the second projector 630 to project the second projection window 631 excluding the overlapped predetermined area 632. In this instance, the first projection window 621 is in an active mode where an object is performed or contact of user's fingers is sensed. The second projection window 631 is in a sleep mode where the object is not performed or the contact of user's fingers is not sensed.

Also, the information control unit 120 may control the first projector 620 to inactivate the overlapped predetermined area 632 and project the first projection window 621. Specifically, the information control unit 120 may control the first projector 620 to project the first projection window 621 excluding the overlapped predetermined area 632. In this instance, the second projection window 631 is in the active mode where the object is performed or contact of user's fingers is sensed. The first projection window 621 is in the sleep mode where the object is not performed or the contact of user's fingers is not sensed.

Figure 7:
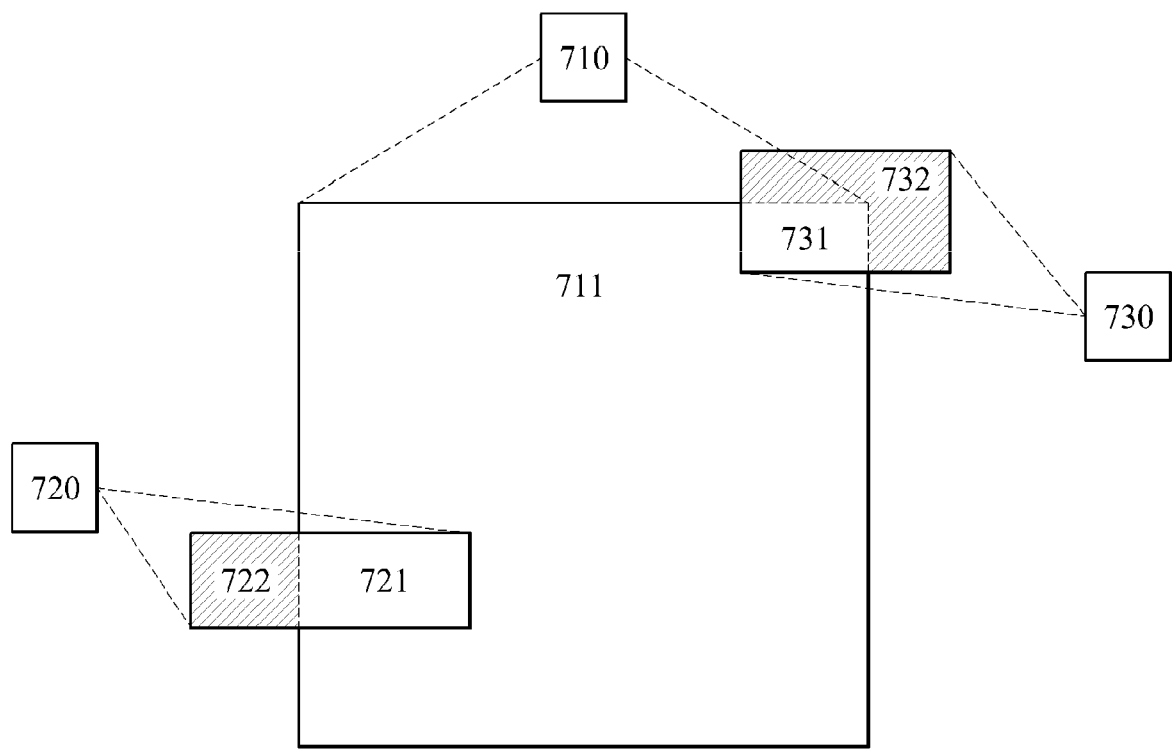
FIG. 7 is a diagram illustrating a projection window performance when a projection window is unobstructed by a background window according to an exemplary embodiment.

FIG. 7 illustrates a projection window performance when a projection window is unobstructed by a background window according to an exemplary embodiment.

In FIG. 7, it is illustrated that a projector 710 projects a background window 711, a first projector 720 projects a first projection window 721 and 722, and a second projector 730 projects a second projection window 731 and 732.

In this instance, as illustrated in FIG. 7, the first projection window 721 and 722 may be projected to have as large an area unobstructed by the background window 711 as a first area 722, and the second projection window 731 and 732 may be projected to have as large an area unobstructed by the background window 711 as a second area 732.

The projector 710 compares first projection window information, received from the first projector 720, to location information of the first projection window 721, projected on the background window 711, and thereby may recognize that the first area 722 is projected to have an area unobstructed by the background window 711, which may be applicable with respect to the second projection window 731 and 732 in the same way. In this case, the projector 710 may be operated to sense an object performance occurring on the first projection window 721 and the second projection window 731 projected on the background window 711. Also, the first projector 720 and the second projector 730 may be operated to control an object performance occurring in the first area 722 and the second area 732.

Figure 8:
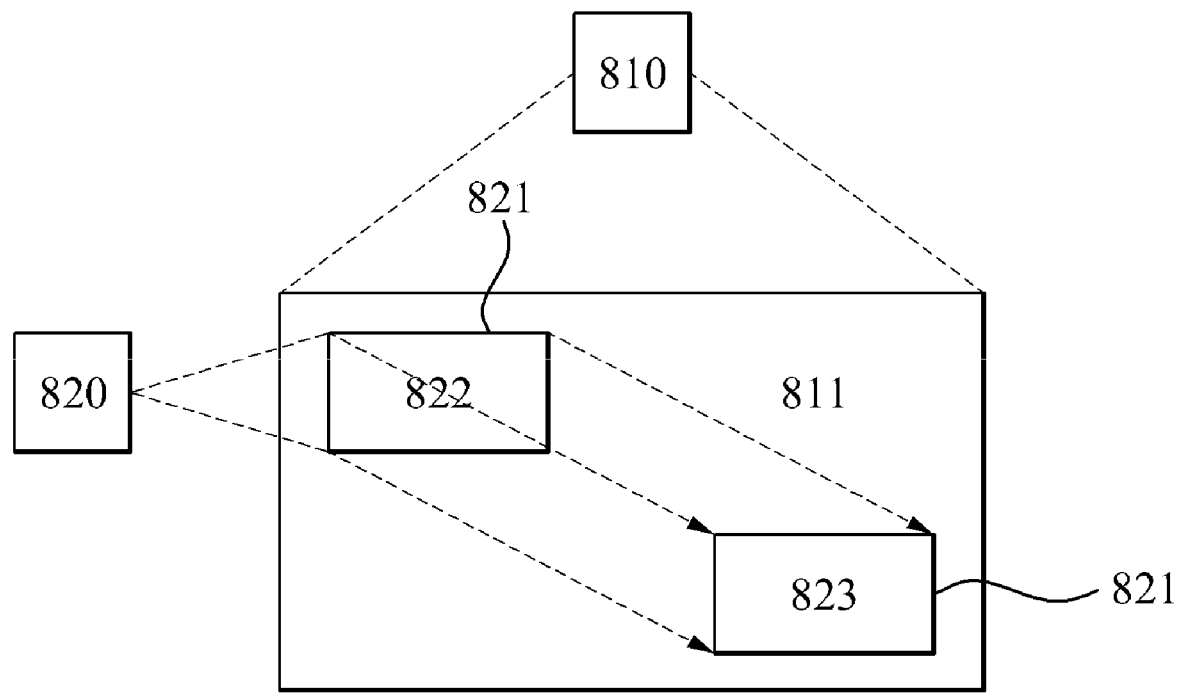
FIG. 8 is a diagram illustrating a projection window performance with respect to a parallel movement of a projection window according to an exemplary embodiment.

FIG. 8 illustrates a projection window performance with respect to a parallel movement of a projection window according to an exemplary embodiment.

In FIG. 8, it is illustrated that a projector 810 projects a background window 811, and a first projector 820 projects a first projection window 821. In this instance, a projection window performance where a parallel movement of the first projection window 821 is performed from a first area 822 to a second area 823 through a user's multi touch sensing input may occur.

In this case, a performance sensing unit 120 of the projector 810 senses the projection window performance, and a projection control unit 110 computes location information about the second area 823 where the first projection window 821 is parallelly moved. An information control unit 130 may control the first projector 820 to project the first projection window 821 on the second area 823 based on the computed location information.

Figure 9:
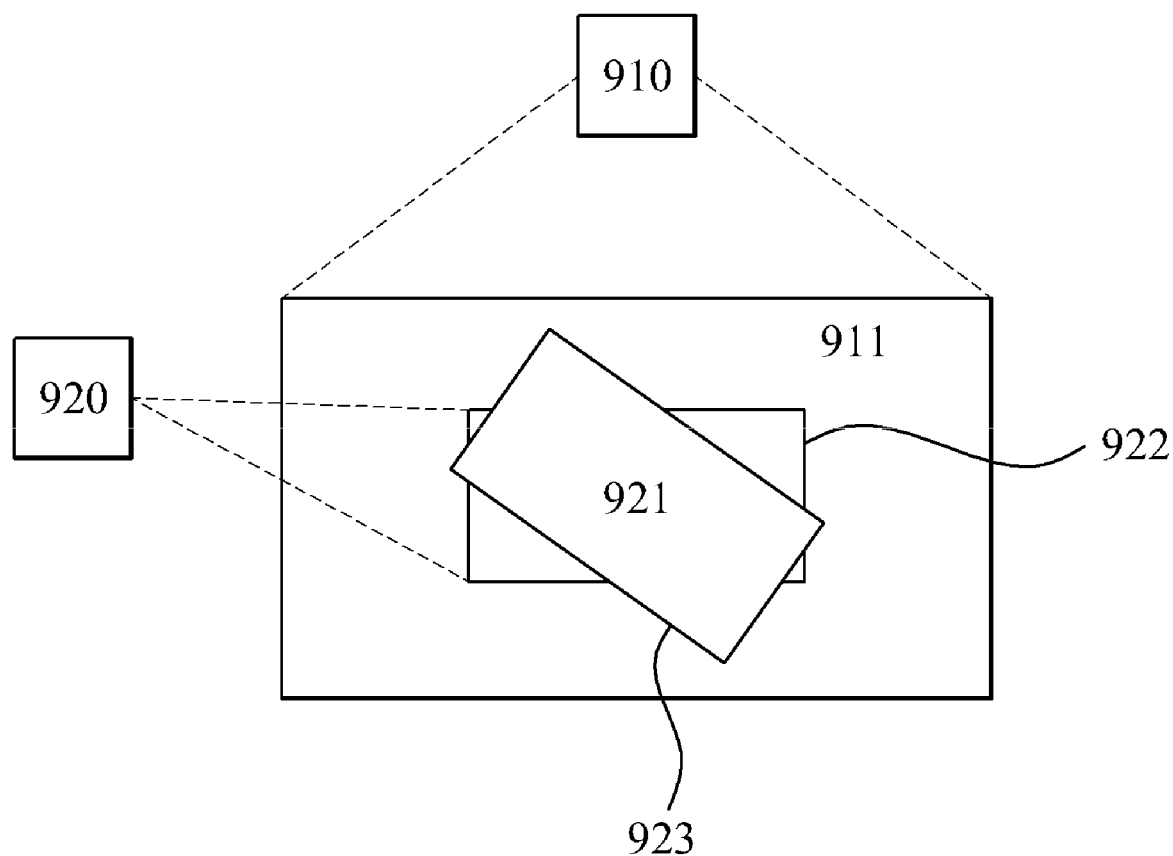
FIG. 9 is a diagram illustrating a projection window performance with respect to a rotational movement of a projection window according to an exemplary embodiment.

FIG. 9 illustrates a projection window performance with respect to a rotational movement of a projection window according to an exemplary embodiment.

In FIG. 9, it is illustrated that a projector 910 projects a background window 911, and a first projector 920 projects a first projection window 921. In this instance, a projection window performance where a rotational movement of the first projection window 921 is performed from a first area 922 to a second area 923 through a user's multi touch sensing input may occur.

In this case, a performance sensing unit 120 of the projector 910 senses the projection window performance, and a projection control unit 110 computes location information about the second area 923 where the first projection window 921 is rotated. An information control unit 130 may control the first projector 920 to project the first projection window 921 on the second area 923 based on the computed location information.

Figure 10:
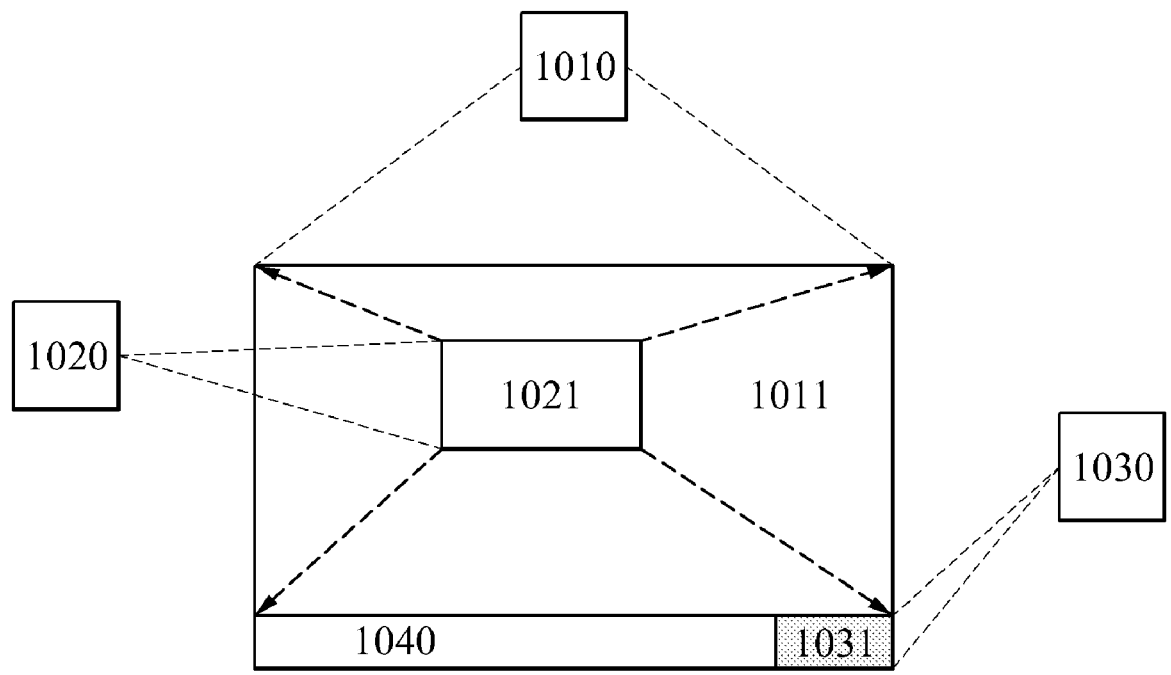
FIG. 10 is a diagram illustrating a projection window performance with respect to a maximization of a projection window according to an exemplary embodiment.

FIG. 10 illustrates a projection window performance with respect to a maximization of a projection window according to an exemplary embodiment.

In FIG. 10, it is illustrated that a projector 1010 projects a background window 1011, a first projector 1020 projects a first projection window 1021, and a second projector 1030 projects a second projection window 1031. In this instance, a projection window performance where a maximization of the first projection window 1021 to the background window 1011 may be performed through a user's multi touch sensing input may occur.

In this case, a performance sensing unit 120 of the projector 1010 senses the projection window performance, and a projection control unit 110 computes size information of the background window 1011 using location information of the background window 1011. An information control unit 130 transmits the size information to the first projector 1020, and thereby may control the first projector 1020 to project the first projection window 1021 having the same size as the background window 1011 on the background window 1011. In this instance, the projector 1010 may control the second projection window 1031 to be minimized and displayed on a bottom area 1040 of the background window 1011.

Figure 11:
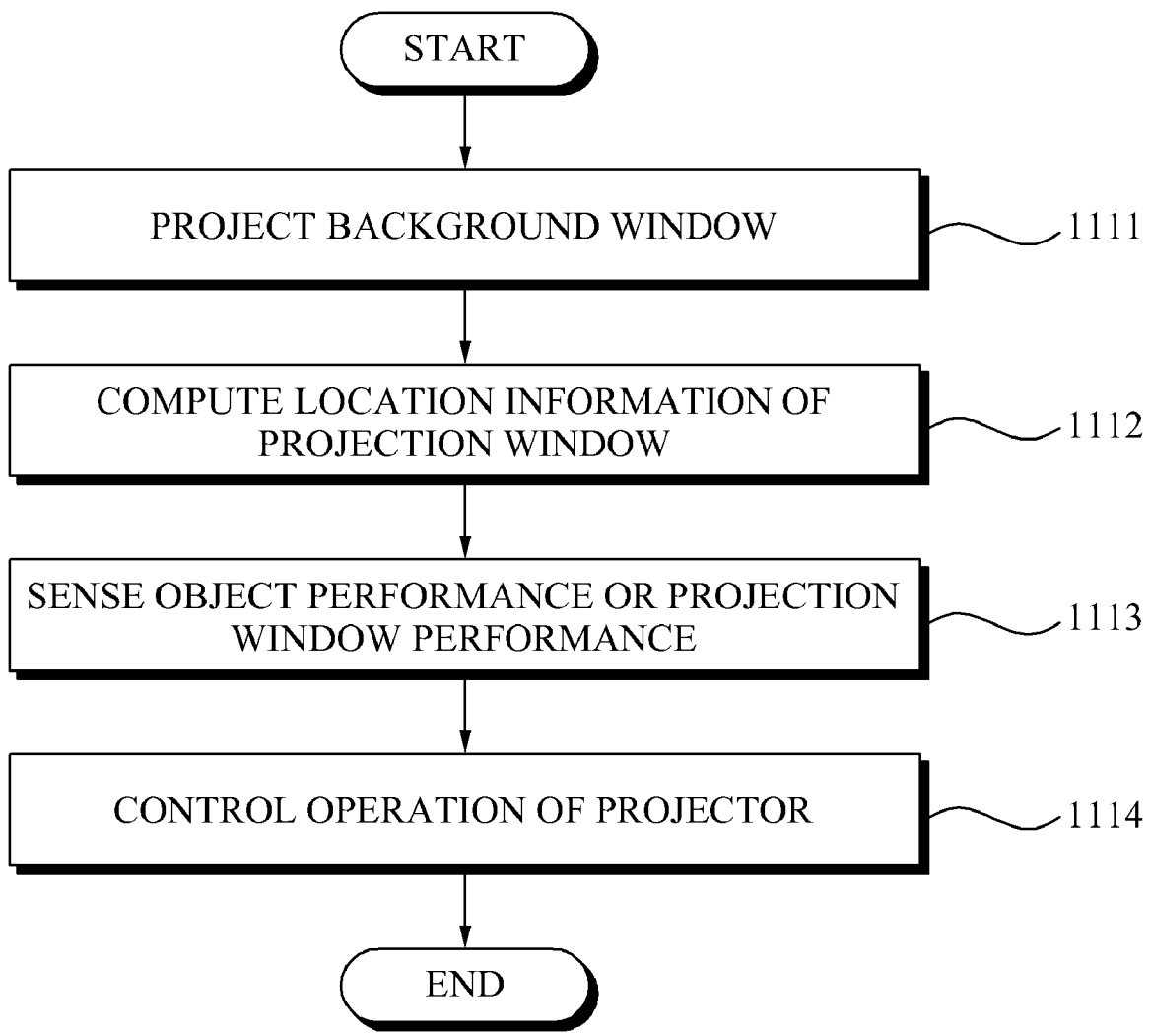
FIG. 11 is a flowchart illustrating an exemplary multiple projection control method of a projector.

FIG. 11 illustrates an exemplary multiple projection control method of a projector.

In operation 1111, the projector projects a background window on a predetermined location. The background window and a projection window may be embodied as multi touch screens.

In operation 1112, the projector computes location information of at least one projection window projected on the background window. In this instance, the at least one projection window may be projected by at least one other projector different from the projector. Also, the at least one projection window may be projected by receiving projection window information from the at least one other projector and including the at least one projection window in the background window. The at least one projection window may be embodied as the multi touch screen. The projector sets the background window as a coordinate plane, computes coordinates or vector of each of the at least one projection window with respect to the coordinate plane, and thereby may compute location information of the at least one projection window.

In operation 1113, the projector senses an object performance occurring on the at least one projection window and the background window or a projection window performance. The object is a software entity included in the at least one projection window.

The object performance covers a movement of an object on the background window and each of the at least one projection window and a performance of the object on the at least one projection window through a user's multi touch sensing input. Also, the projection window performance includes a parallel movement, rotational movement, maximization, minimization, and overlapping with another projection window of each of the at least one projection window with respect to the background window.

In operation 1114, the projector controls an operation of each projector. The operation corresponds to the object performance. For example, when an object performance where an object of a first projection window moves to a second projection window through the user's input is sensed, the projector may control data corresponding to the object of the first projection window to be transmitted from a first projector to a second projector.

Although a multiple projection control method has been described with reference to FIG. 11, it is apparent to those skilled in the related art that a multiple projection control method may be embodied to include all multiple projection control operations of the projector described with reference to FIGS. 1 through 10.

The above-described methods including the multiple projection control method may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

According to certain embodiments described above, there is provided a projector and multiple projection control method of the projector which projects a background window, enables at least one other projector to project projection windows on the background window, thereby recognizing an object performance occurring on each of the projection windows through the background window, and control a corresponding operation of each of the at least one other projectors.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A projector, comprising:
 a projection control unit which controls a projection of a background window and computes location information of at least one projection window projected on the background window;
 a performance sensing unit which senses an object performance on the background window and the at least one projection window;
 a communication unit which communicates with at least one other projector different from the projector; and
 an information control unit which controls an operation of each of the at least one other projector, the operation corresponding to the object performance.

2. The projector of claim 1, wherein the background window and the at least one other projection window are multi touch screens, the object is a software entity included in the at least one projection window, and the object performance includes a movement of the object between the background window and the at least one projection window according to a multi touch sensing input of a user via the multi touch screen, and a performance of the object on the at least one projection window.

3. The projector of claim 1, wherein the projection control unit maintains a coordinate plane corresponding to the background window and computes location information including coordinates of each of the at least one other projection window with respect to the coordinate plane.

4. The projector of claim 1, wherein the projection control unit projects the background window including a predetermined projection window.

5. The projector of claim 1, wherein, in response to the performance sensing unit sensing an object performance where an object of a first projection window moves to a second projection window through an input of the user, the information control unit controls data corresponding to the object of the first projection window to be transmitted to a second projector from a first projector.

6. The projector of claim 1, wherein, in response to the performance sensing unit sensing a projection window performance where a portion of a first projection window and a portion of a second projection window are overlapped through an input of the user, the information control unit controls a second projector to project a second projection window where the portion of the second projection window is inactive on the background window.

7. The projector of claim 1, wherein, in response to the performance sensing unit sensing a projection window performance which maximizes a first projection window through an input of the user, the information control unit controls a first projector to project the first projection window having a same size as the background window on the background window, and controls the first projector to project a projection window excluding the first projection window to be inactive.

8. A projector, comprising:
- a communication unit which receives projection window information from at least one other projector different from the projector;
- a projection control unit which controls a background window including a projection window corresponding to the projection window information to be projected on a predetermined location;
- a performance sensing unit which senses an object performance on the background window and each of the at least one projection window; and
- an information control unit which controls an operation of each of the at least one other projector, the operation corresponding to the object performance.

9. The projector of claim 8, wherein the background window and the at least one projection window are multi touch screens, the object is a software entity included in the projection window, and the object performance includes a movement of the object between the background window and each of the at least one projection window according to a multi touch sensing input of a user via the multi touch screen, and a performance of the object on the at least one projection window.

10. The projector of claim 8, wherein the projection control unit maintains a coordinate plane corresponding to the background window and computes location information including coordinates of each of the at least one projection window with respect to the coordinate plane.

11. The projector of claim 8, wherein, in response to the performance sensing unit sensing an object performance where an object of a first projection window moves to a second projection window through an input of a user, the information control unit controls data corresponding to the object of the first projection window to be transmitted to a second projector from a first projector.

12. The projector of claim 8, wherein, in response to the performance sensing unit sensing a projection window performance where a portion of a first projection window and a portion of a second projection window are overlapped through an input of a user, the information control unit controls the overlapped portion of the second projection window to be inactive.

13. The projector of claim 8, wherein, in response to the performance sensing unit sensing a projection window performance which maximizes a first projection window through an input of a user, the information control unit controls a first projection window having a same size as the background window to be projected, and controls a projection window excluding the first projection window to be inactive.

14. A multiple projection control method, the method comprising:
- projecting a background window on a predetermined location;
- computing location information of at least one projection window projected on the background window;
- sensing an object performance on the background window and each of the at least one projection window; and
- controlling an operation of each projector, the operation corresponding to the object performance.

15. The multiple projection control method of claim 14, wherein the background window and the at least one projection window are multi touch screens, the object is a software entity included in the projection window, and the object performance includes a movement of the object between the background window and the at least one projection window according to a multi touch sensing input of a user via the multi touch screen, and a performance of the object on the projection window.

16. The multiple projection control method of claim 14, wherein the sensing comprises sensing an object performance where an object of a first projection window moves to a second projection window through an input of a user, and the controlling comprises controlling data corresponding to the object of the first projection window to be transmitted to a second projector from a first projector.

17. The multiple projection control method of claim 16, further comprising:
- sensing a projection window performance occurring on the background window due to the input of the user; and
- controlling the operation of each of the projectors, the operation corresponding to the projection window performance.

18. A computer-readable recording medium storing a program for implementing a multiple projection control method, comprising:
- projecting a background window on a predetermined location;
- computing location information of at least one projection window projected on the background window;
- sensing an object performance on the background window and each of the at least one projection window; and
- controlling an operation of each projector, the operation corresponding to the object performance.

* * * * *